United States Patent [19]

Roettele et al.

[11] 4,280,223
[45] Jul. 21, 1981

[54] RADAR DETECTOR

[75] Inventors: Donald L. Roettele; William E. Yohpe, both of Dayton, Ohio

[73] Assignee: ComGeneral Corporation, Dayton, Ohio

[21] Appl. No.: 75,016

[22] Filed: Sep. 13, 1979

Related U.S. Application Data

[63] Continuation of Ser. No. 777,311, Mar. 14, 1977, abandoned.

[51] Int. Cl.³ .......................... H04B 1/00; H03D 1/00
[52] U.S. Cl. ...................................... 375/93; 455/325;
455/324; 455/130; 455/228; 343/18 D
[58] Field of Search .............................. 375/92, 93, 94;
455/130, 131, 226–228, 324, 302, 325, 328, 334,
330, 347, 351; 343/5 R, 113 R, 18 R, 18 E, 17.7,
785, 850, 894, 18 D

[56] References Cited

U.S. PATENT DOCUMENTS

| 2,998,943 | 9/1961 | Dobbins | 455/39 |
| 3,094,663 | 6/1963 | Siegel | 445/325 |
| 3,623,091 | 11/1971 | Mayo, Jr. | 343/18 D |
| 3,716,791 | 2/1973 | Harries | 343/113 R |
| 4,122,449 | 10/1978 | Endo | 455/325 |

Primary Examiner—Benedict V. Safourek
Assistant Examiner—Tommy P. Chin
Attorney, Agent, or Firm—Jacox & Meckstroth

[57] ABSTRACT

A compact radar detector incorporates an elongated dielectric antenna, one end of which is coupled to an aligned cylindrical resonant waveguide. The dielectric antenna has cylindrical and tapered portions which cooperate with the waveguide to provide a narrower beam width, high gain and more directivity in comparison to prior art radar detectors. The antenna projects forwardly from a relatively thin rectangular housing which encloses the waveguide and other components in a manner providing for convenient and efficient assembly.

11 Claims, 4 Drawing Figures

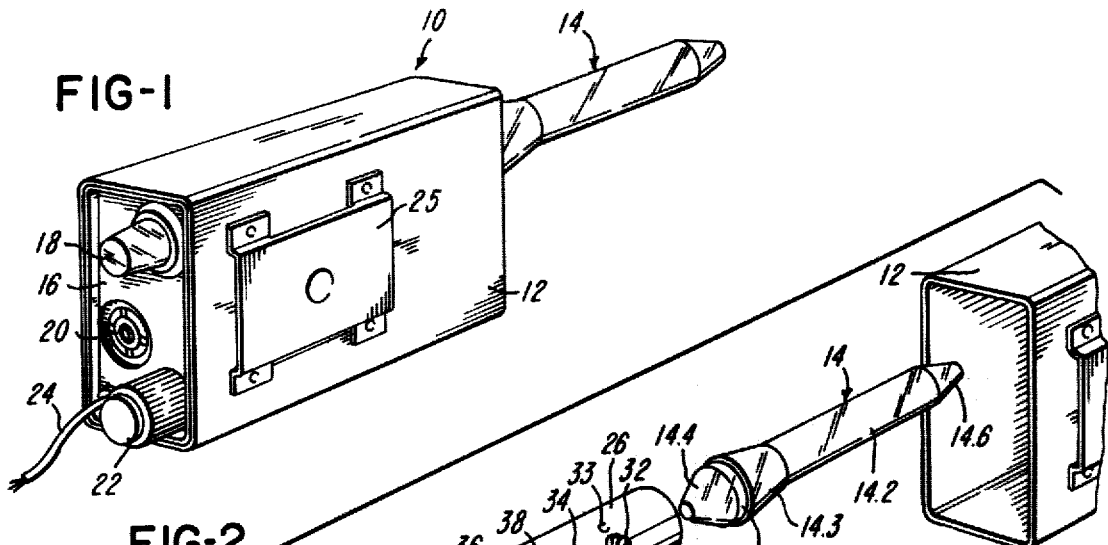
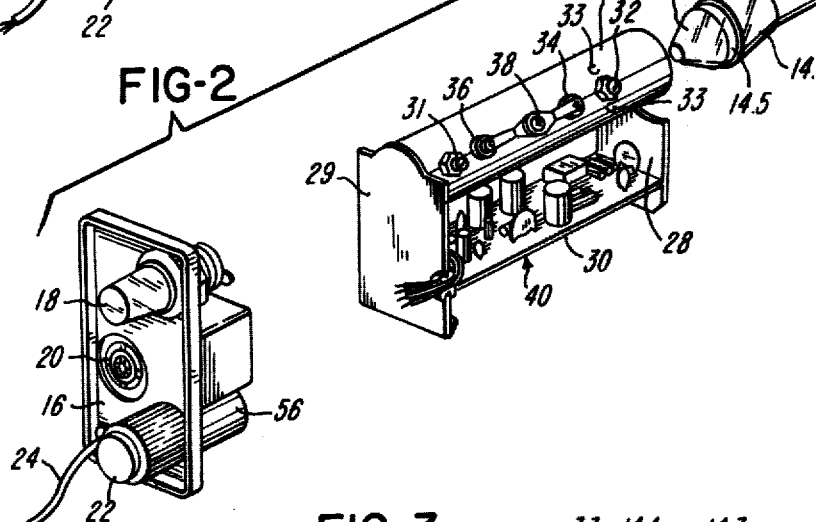
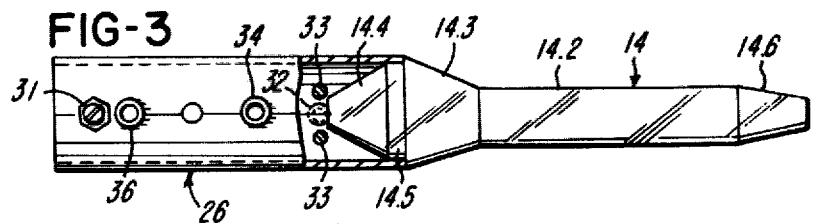
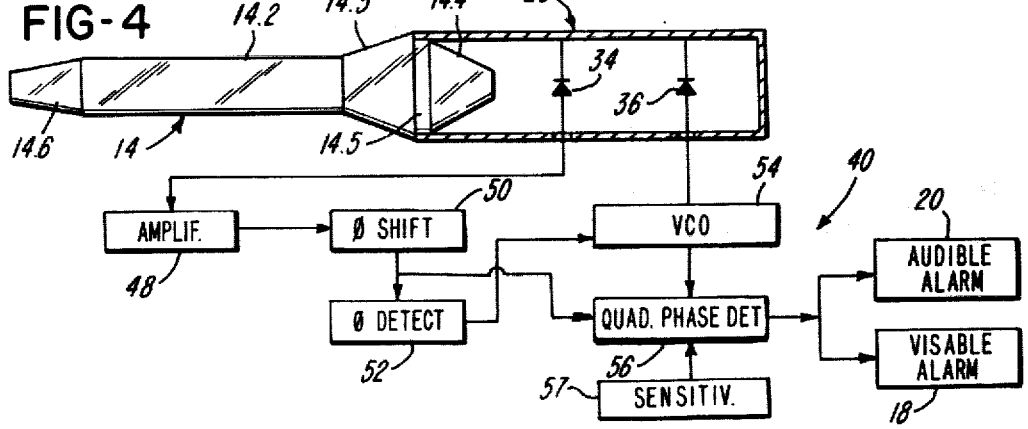

RADAR DETECTOR

RELATED APPLICATION

This application is a continuation of pending application Ser. No. 777,311, filed Mar. 14, 1977, now abandoned.

BACKGROUND OF THE INVENTION

This invention relates to energy detectors and more particularly to an electronic device for detecting the presence of radar energy in the radio frequency band.

At present, both consumer advocate groups as well as individual consumers are becoming increasingly sensitive to various types of pollution. However, the introduction of some sophisticated electronic devices has created a new form of pollution which is considerably less obvious than the clouds of smoke belching from a tall smoke stack, but is no less present or insidious. This new form of pollution is electronic in nature and can be generated by devices such as television receivers, radar ovens, citizen band receivers and the like.

The Federal Communications Commission now requires that each such device have "type approval" to assure that, when the device leaves the factory, the radiation will not exceed a given level at a specified distance from the device. Thus in the case of a radar oven, the user is assured of low levels of any radar leakage when the oven is new. However, no means are provided for detecting any excessive radiation leakage, for example, after the radio frequency (R.F.) seals around the door age and crack, and excessive R.F. energy escapes. Similarly, excessive R.F. energy may escape from a television receiver, and unless the exact point of the escaping R.F. energy is located, the use may be subjected to excessively high levels of R.F. energy.

Heretofore, unless the user of an electronic appliance or device had access to a radio laboratory with sophisticated R.F. detectors, the escaping R.F. energy would go undetected. In order to locate and pinpoint escaping R.F. energy, a person could attempt to use one of the radar detectors currently being marketed under various trademarks for detecting police radar surveillance to transceivers to avoid speeding tickets. These detectors, while able to detect gross amounts of radar energy, are limited in pinpointing R.F. energy escaping from a device such as a radar oven, due to the fact that the police radar detectors commonly use open end tapered horns as an impedance matching device for rectangular waveguides, and are not adapted for pinpointing a source of radar energy.

SUMMARY OF THE INVENTION

The present invention is directed to an improved compact radar detector which permits the user to locate R.F. energy quickly and with high sensitivity. In accordance with the invention, a microwave receiver is provided with both audible and visual alarms or indicators for alerting the user when the detected R.F. exceeds a predetermined level. As one feature, the detector of the invention distinguishes over other detectors by employing an elongated dielectric antenna with predetermined tapered sections or portions. One end of the antenna is coupled directly to a circular waveguide resonant chamber, and the other end of the antenna is adapted to be pointed toward the source of R.F. energy to provide an extremely high gain and directional array. Furthermore, since the detector is capable is detecting R.F., it may also be used as a radar surveillance detector due to its high gain and high directivity.

It is thus an important object of the invention to provide an improved radar detector that is capable of pinpointing a source of radiating R.F. energy. As another object and feature, the invention provides a radar detector which is not only portable but is also smaller and more efficient than the present devices which use a tapered horn as an impedance matching device. Still another object and feature of the invention is to provide a radar detector having a higher gain antenna than heretofore available.

Other features and advantages of the invention will be apparent from the following description, the accompanying drawing and the appended claims.

BRIEF DESCRIPTION OF THE DRAWING

FIG. 1 is a perspective view of the assembled radar detector constructed in accordance with the invention;

FIG. 2 is an exploded perspective view of the detector of FIG. 1 and showing the assembled relation of major components;

FIG. 3 is a plan view of the assembled antenna and the waveguide section used in the detector shown in FIGS. 1 and 2; and FIG. 4 is a block electrical diagram of the receiver which is used with the antenna and waveguide section of FIG. 3.

DESCRIPTION OF THE PREFERRED EMBODIMENT

Referring to FIG. 1, a radar detector 10 incorporates a relatively thin rectangular sheet metal case or housing 12 having one end wall with a circular opening through which projects a solid dielectric, high gain antenna 14. The antenna functions to collect and focus the R.F. energy to be detected in the manner of a surface wave antenna.

Preferably, the antenna is formed or molded of a transparent acrylic resin such as sold by E. I. DuPont De Nemours & Company under the trademark "Lucite". A sheet metal rear panel 16 is recessed within the other end of the housing 12 and supports a light element or visual alarm 18 and a beeper or audible alarm 20 for indicating visually and audibly the presence of detected R.F. energy above a given level that is set by adjusting a potentiometer connected to a control knob 22.

A power supply cord 24 provides a source of operating potential for the receiver section shown in FIG. 2, for example, at a level of twelve volts. The housing 12 is also provided with a mounting bracket 25 which is adapted to receive a spring clip (not shown) so that detector 10 may be conveniently attached to a panel or other member. For example, when the unit is used as a radar surveillance detector, the spring clip is adapted to engage a sun visor of a motor vehicle so that the device is positioned to "look through" the windshield for detecting any radar energy being transmitted.

Referring to FIG. 2, a tubular or circular waveguide 26 is supported by metal support panels or brackets 28 and 29 which are attached to opposite end portions of the waveguide. The brackets 28 and 29 also support a printed circuit board 30 on which the receiver components are interconnected. Since the waveguide 26 exhibits inductive reactance, a capacitive tuning screw or stub 31 is provided to resonate the waveguide section 26 and a modulator diode 36. A tuning stub 32 extends radially into the waveguide 26 between a pair of parallel spaced solid inductive tuning rods 33 which extend completely through the waveguide and form a frequency selective filter.

FIG. 3 shows the cooperation between antenna 14 and waveguide 26. The antenna 14 has a cylindrical portion 14.2 of a predetermined diameter and length dependent on the frequency of operation. The cylindrical portion 14.2 connects with a frusto-conical or tapered portion 14.3 which is connected to another frusto-conical or tapered portion 14.4 by a cylindrical portion 14.5. The portion 14.5 has an outside diameter approximately equal to the inside diameter of the tubular waveguide 26 to form a snug or tight press fit of the lens or antenna 14 within the waveguide 26. The antenna 14 also incudes a frusto-conical or tapered forward end or tip portion 14.6 which provides a portion wherein the impedance changes gradually in order to minimize reflections. As shown in FIG. 2, capacitive tuning stubs 31 and 32 are the frequency determining elements, and the axially spaced diodes 34 and 36 extend diametrically into the waveguide 26 between the tuning stubs. The diodes 34 and 36 are retained within the waveguide 26 by corresponding leaf springs 37 which are secured to the waveguide 26 by a screw 38.

The antenna 14 and waveguide 26 cooperate with a receiver 40 which is shown in block diagram in FIG. 4 and functions to actuate the audio alarm 20 and visible alarm 18 in the presence of an R.F. field above a predetermined level. In the operation of the receiver 40, any signal received by the antenna 14 is coupled, as previously mentioned, to the waveguide 26 where it is detected by detector diode 34 and applied as an input to a low noise, high gain amplifier 48. This amplifier, by way of example, may be a National Semiconductor type LM-387 having a gain of about 80 db peaked at 1 Khz.

The amplified signal is applied as an input to a phase shifter network 50. The shifter network 50 consists of a resistor-capacitor combination which operates as a low pass filter having, at the operating frequency of about 1 Khz, a phase slope of approximately 25° per octave of frequency. The square wave output from a voltage controlled oscillator (VCO) 54 is applied to the diode 36 which functions as a chopper to modulate any R.F. detected by diode 34. The modulated and amplified signal is shifted in phase by the network 50 and is applied to the phase detector 52 and quadrature phase detector 56.

The phase detector 52 output is then applied to the VCO 54 causing its frequency of operation to shift or vary until a frequency is obtained which results in a 90° phase relationship between the VCO output and the output of the phase shifter network 50. This results in the quadrature phase detector 56 output going to the low value set by a sensitivity control potentiometer 57 as adjusted by the control knob 22 (FIGS. 1 and 2). A zero or low voltage output causes signal devices 18 and 20 to be activated to indicate the presence of R.F. energy. Preferably, VCO 54 and phase detector 52 and quadrature phase detector 56 are incorporated in an IC device designated as a "567 Tone Decoder".

From the drawing and the above description, it is apparent that a radar detector constructed in accordance with the present invention, provides desirable features and advantages. For example, the incorporation of the projecting surface wave antenna 14 with the tubular or circular waveguide section 26 provides for a small, compact, light weight, and effective detector unit which is adapted to be efficiently manufactured. In addition, the antenna 14 is adapted to be produced by injection molding and thus contributes to a low manufacturing cost of the detector unit and is simplified assembly. The waveguide section 26 is also adapted to be formed from a section of relatively inexpensive copper water supply tubing, thus contributing to minimize the cost of the waveguide section. In addition, the relative arrangement and assembly of the waveguide section 26 and the parallel spaced circuit board 30 contribute to the compactness and simplified assembly of the waveguide section and circuit board into the case or housing 12 after the antenna 14 is coupled to the waveguide section 26.

While the above described embodiment is considered the preferred embodiment of the invention, it is obvious to those skilled in the art that various changes and modifications may be made therein without departing from the true spirit and scope of the invention as defined in the appended claims.

What is claimed is:

1. An improved radar detector comprising a housing, an elongated tubular waveguide disposed within said housing, an elongated dielectric antenna having a first tapered portion projecting into said waveguide for matching the impedances of said antenna and said waveguide, said antenna having a second portion projecting outwardly from said housing for collecting radar signals, said second portion of said dielectric antenna includes a first frusto-conical portion and a second frusto-conical portion connected by an elongated substantially cylindrical portion, means for detecting radar signals received within said waveguide, oscillator means, modulator means for receiving a reference signal from said oscillator means and in response modulating the radar signals detected by said detecting means, means for amplifying the signals detected by said detecting means, phase shifter means for receiving the amplified signals from said amplifying means and for shifting the phase of the amplified signals, phase detector means for receiving the reference signal from said oscillator means and the shifted signals from said phase shifter means, and alarm means connected to said phase detector means to produce an alarm signal when the reference and shifted signals received by said phase detector means are synchronous in frequency and have a predetermined phase relation.

2. The radar detector as defined in claim 1 wherein said oscillator means comprise a voltage controlled oscillator, said phase detector means comprise a first quadrature phase detector for detecting a phase relating 90° between the reference signal from said oscillator means and the shifted signal from said phase shifter means, and a second phase detector for detecting the phase shift in the shifted signal from said phase shifter means and in response supplying a control voltage to said voltage controlled oscillator.

3. A radar detector as defined in claim 1 wherein said housing has an elongated generally rectangular configuration with a length and width substantially greater than its thickness, said tubular waveguide extends longitudinally within said housing, an elongated circuit board extending within said housing substantially parallel to said waveguide, said antenna projects outwardly from one end of said housing, and said alarm means is disposed adjacent the opposite end of said housing.

4. A radar detector as defined in claim 1 wherein said housing includes substantially parallel spaced generally rectangular side walls each having a length and with substantially greater than the housing thickness defined between said side walls, and said means for detecting radar signals comprise a diode extending within said waveguide with an axis disposed at an acute angle relative to said side walls of said housing.

5. An improved radar detector comprising a housing, an elongated tubular waveguide disposed within said housing, an elongated dielectric antenna having a first portion projecting into said waveguide and a second portion projecting outwardly from said waveguide for collecting radar signals, said second portion of said dielectric antenna includes a frusto-conical portion disposed adjacent said waveguide and connected to an elongated substantially cylindrical portion, means for detecting radar signals received within said waveguide, oscillator means, modulator means for receiving a reference signal from said oscillator means and in response modulating the radar signals detected by said detecting means, means for amplifying the signals detected by said detecting means, phase shifter means for receiving the amplified signals from said amplifying means and for shifting the phase of the amplified signals, phase detector means for receiving the reference signal from said oscillator means and the shifted signals from said phase shifter means, and alarm means connected to said phase detector means to produce an alarm signal when the reference and shifted signals received by said phase detector means are synchronous in frequency and have a predetermined phase relation.

6. The radar detector as defined in claim 5 wherein said oscillator means comprise a voltage controlled oscillator, said phase detector means comprise a first quadrature phase detector for detecting a phase relating 90° between the reference signal from said oscillator means and the shifted signal from said phase shifter means, and a second phase detector for detecting the phase shift in the shifted signal from said phase shifter means and in response supplying a control voltage to said voltage controlled oscillator.

7. An improved radar detector comprising an elongated housing, an elongated generally cylindrical metal waveguide extending longitudinally within said housing and having opposite end portions, an elongated dielectric antenna having a first portion projecting into one said end portion of said waveguide, said antenna having a second portion projecting outwardly from said one end portion of said waveguide for collecting radar signals, a set of metal support members secured to said opposite end portions of said waveguide in electrical conducting relation, an elongated circuit board extending between said support members generally parallel to said waveguide, means for detecting radar signals received within said waveguide, means for amplifying the signals received by said detecting means, alarm means, and circuit means mounted on said circuit board for actuating said alarm means in response to a predetermined amplified signal output from said amplifying means.

8. A radar detector as defined in claim 7 wherein said second portion of said antenna includes a frusto-conical portion projecting outwardly from said support member connected to said one end portion of said waveguide.

9. An improved radar detector comprising a housing, an elongated tubular waveguide disposed within said housing, an elongated dielectric antenna having a first portion projecting into said waveguide, said antenna having a second portion projecting outwardly from said waveguide for collecting radar signals, means for detecting radar signals received within said waveguide, means for amplifying the signals received by said detecting means, phase shifter means connected to receive amplified signals from said amplifying means, phase detector means connected to receive signals from said phase shifter means, means for modulating the radar signals received within said waveguide, oscillator means for supplying a signal to said modulating means and a reference signal to said phase detector means, alarm means connected to produce an alarm signal when the signals received by said phase detector means are synchronous in frequency and have a predetermined phase relation, an elongated circuit board extending generally parallel to said waveguide, and a set of longitudinally spaced support members connected to opposite end portions of said waveguide and supporting said circuit board.

10. An improved radar detector comprising an elongated housing, an elongated tubular metal waveguide extending longitudinally within said housing and having opposite end portions, an elongated dielectric antenna having a first portion projecting into one said end portion of said waveguide, said antenna having a second portion projecting outwardly from said one end portion of said waveguide for collecting radar signals, a set of metal support members secured to said opposite end portions of said waveguide, an elongated circuit board extending between said support members generally parallel to said waveguide, means for detecting radar signals received within said waveguide and including at least one diode extending within said waveguide with an axis disposed at an acute angle relative to said circuit board, means for amplifying the signals received by said detecting means, alarm means, and circuit means mounted on said circuit board for actuating said alarm means in response to a predetermined amplified signal output from said amplifying means.

11. An improved radar detector comprising an elongated housing, an elongated tubular metal waveguide extending longitudinally within said housing and having opposite end portions, an elongated dielectric antenna having a first portion projecting into one said end portion of said waveguide, said antenna having a second portion projecting outwardly from said one end portion of said waveguide for collecting radar signals, a set of metal support members secured to said opposite end portions of said waveguide, an elongated circuit board extending between said support members generally parallel to said waveguide, means for detecting radar signals received within said waveguide and including a set of axially spaced diodes extending laterally into said waveguide, means including a fastener secured to said waveguide between said diodes for retaining said diodes within said waveguide, means for amplifying the signals received by said detecting means, alarm means, and circuit means mounted on said circuit board for actuating said alarm means in response to a predetermined amplified signal output from said amplifying means.

* * * * *